Patented Sept. 15, 1953

2,652,392

UNITED STATES PATENT OFFICE 2,652,392

SUSPENSION POLYMERIZATION OF UNSATURATED ORGANIC COMPOUNDS

Walter Peter Hohenstein, Kew Gardens, N. Y., and Robert Nobbs Haward and Joyce Elly, London, England; said Haward and said Elly assignors to said Hohenstein No Drawing. Application April 28, 1951, Serial No. 223,654. In Great Britain May 17, 1950

28 Claims. (Cl. 260—86.7)

1

This invention relates to the polymerisation of unsaturated organic compounds which contain a $CH_2:C<$ group in the molecule, i. e. Compounds which contain a vinyl or vinylidene radical in the molecule and particularly to the polymerisation of such organic compounds by the suspension or pearl polymerisation method.

It is known to polymerise unsaturated organic compounds such as styrene in aqueous suspensions in the presence of a finely divided, inorganic substance which is also suspended or dispersed in the water and acts as a suspension stabiliser. The organic compound and the inorganic solid substance are maintained during the polymerisation reaction in suspension in water by agitation and at the end of the reaction the polymerised product is obtained in the form of discrete particles (hence the name pearl).

In United States Patent No. 2,524,627 a process for the pearl polymerisation of unsaturated organic compounds is described in which tricalcium phosphate is used as the suspension stabiliser in the presence of a polymerisation catalyst which is soluble in the monomer. Further in our pending United States patent application Serial No. 137,266 a process for the pearl polymerisation of unsaturated organic compounds is described in which there is used as suspension stabiliser a calcium phosphate which has a $CaO/P_2O_5$ ratio by weight of at least 1.35 and is substantially neutral, i. e. a 1% suspension in distilled water has a pH value between 4 and 9.

It has now been found that the results obtained with the pearl polymerisation process using a calcium phosphate as stabiliser are improved if a very small quantity (less than 100 parts per million) of a water-soluble persulphate is added to the aqueous suspension in which polymerisation takes place. The presence of the persulphate reduces the tendency of the pearls to cake together particularly when a high ratio of monomer to water is used and results in the formation of more uniformly sized pearls.

The invention consists in carrying out the pearl polymerisation of unsaturated organic compounds which contain a $CH_2:C<$ group in the molecule in aqueous suspension in the presence of suspended particles of a calcium phosphate and in the presence, during at least part of the polymerisation process, of up to 0.01% by weight of the whole system, of a dissolved persulphate.

The preferred persulphate is potassium persulphate but other persulphates such as sodium persulphate or ammonium persulphate may be used in the process of the invention.

In the preferred method of carrying out the process of the invention the monomer or monomers and a suitable catalyst are dispersed by agitation in the aqueous medium and the finely divided calcium phosphate is added after the mixture with continuous agitation has been maintained at or close to the temperature of polymerisation for about 10 to 45 minutes. The whole of the persulphate may be added together with the phosphate but it is preferred to add part only together with the phosphate at the beginning of the process and the remainder in one or more lots at subsequent stages in the polymerisation process. Alternatively, the whole of the persulphate may be added at a later stage in the process. The addition of the persulphate should, however, be completed before the polymerisation is about 50 to 75% complete.

The calcium phosphate used in the process of the invention is preferably a substantially neutral calcium phosphate having a $CaO/P_2O_5$ ratio by weight of at least 1.35 such as is referred to in pending application Serial No. 137,266 but a commercial tri-calcium phosphate or hydroxyapatite may be used as the suspension stabiliser. With the phosphate having a $CaO/P_2O_5$ ratio by weight of at least 1.35 particularly low concentrations of persulphate, e. g. up to 10 parts per million by weight of the whole system, may be used. The calcium phosphate may be used in an amount which constitutes from 0.05 to 0.5% by weight of the whole system and the monomer to water ratio by volume may be from 1:3 to 3:2.

A calcium phosphate having a $CaO/P_2O_5$ ratio by weight of at least 1.35 may be prepared, as described in pending application Serial No. 137,266, by precipitation with phosphoric acid from a hot dilute aqueous suspension of lime containing not more than 5% by weight and preferably from 1-2% by weight of lime at a temperature in the region of 90° C. to obtain a substantially neutral product. By a substantially neutral product is meant one which in a 1% suspension in distilled water has a pH value between 4 and 9 and preferably between 6 and 8. Thus the product must not contain free lime which dissolves in water to give an alkaline suspension.

The process of the invention may be applied to the polymerisation of unsaturated organic compounds which contain a $CH_2:C<$ group in the molecule and which are capable of being polymerised by the action of heat, light, and/or of a catalyst within the temperature range of 0 to 150° C. and may be carried out under pressure if necessary or advantageous. It may be applied with particular advantage to the polymerisation of styrene with monomer to water ratios by volume of from 2:3 to 3:2 but it may also be applied to the polymerisation of other vinyl or vinylidene compounds such as substituted derivatives of styrene, acrylic acid derivatives, or vinyl acetate. It may in addition be applied to the copolymerisation of these compounds, for example to the copolymerisation of styrene and methyl methacrylate. In all cases the organic compounds should be substantially insoluble in water or capable of being rendered so by the addition of a suitable concentration of a salt, such as sodium chloride or a mixture of salts which does not unduly affect the stability of the system.

It has also been found in some cases and particularly when a commercial tri-calcium phosphate or hydroxyapatite is used as the suspension stabiliser to be an advantage to add a small quantity of acid, for example, acetic acid, formic acid, or phosphoric acid to the polymerisation mixture.

Examples of processes carried out in accordance with the invention are described below.

EXAMPLE 1

220 ccs. of demineralised water were stirred in a 500 ccs. three necked flask with a V stirrer at 700 revolutions per minute. The flask, which was fitted with a reflux condenser, was immersed in an oil bath at 90° C. After ½ hour 220 ccs. of styrene, containing 0.4 gm. benzoyl peroxide, was added to the flask and this was followed by the addition of 2.1 gms. of commercial tricalcium phosphate with a $CaO/P_2O_5$ ratio of 1.19
6.7 ccs. of a 10% by weight aqueous solution of formic acid, and
2.1 ccs. of a 1% by weight aqueous solution of potassium persulphate.

After stirring at 90° C. for 12 hours hard polystyrene pearls were obtained.

EXAMPLES 2 AND 3

220 ccs. of water were stirred in a 500 ccs. three necked flask with a V stirrer at 700 revolutions per minute. The flask, which was fitted with a reflux condenser, was immersed in an oil bath at 90° C. After ½ hour, 220 ccs. of styrene, containing 0.4 gm. benzoyl peroxide, were added to the flask and this was followed after ¼ hour by the addition of 0.42 gm. of a substantially neutral calcium phosphate prepared by precipitation with phosphoric acid from a hot dilute aqueous suspension of lime and having a $CaO/P_2O_5$ ratio by weight of about 1.38.

Three polymerisations were carried out with this mixture. In the first polymerisation, which is not illustrative of the invention and was carried out for comparative purposes only, no potassium persulphate was added, in the second polymerisation (Example 2) 5 parts per million by weight of potassium persulphate were added together with the phosphate and in the third polymerisation (Example 3) 2.5 parts per million by weight of potassium persulphate were added together with the phosphate and a further 2.5 parts per million ¾ hour later. The amount of potassium persulphate was in each case based on the total weight of the system. In all three cases the mixture was stirred at 90° C. for 12 hours.

The polystyrene pearls obtained in each case were subjected to sieve analysis with B. S. S. sieves to determine the proportions of different sized pearls present. The results are tabulated below:

*Sieve analysis*

|  | First Polymerisation | Second Polymerisation, Ex. 2 | Third Polymerisation, Ex. 3 |
|---|---|---|---|
|  | Percent | Percent | Percent |
| Sieve No. 10 | 19 | Nil | Nil |
| Sieve No. 14 | 23 | 4 | Nil |
| Sieve No. 22 | 46 | 60 | 37 |
| Sieve No. 30 | 10 | 33 | 53 |
| over 30 | 2 | 3 | 10 |

It will be seen that the use of persulphate leads to the formation of finer and more uniform pearls. The mouldings made from such pearls have a superior clarity and colour.

EXAMPLE 4

220 ccs. of demineralised water were stirred in a 500 ccs. three necked flask with a V stirrer at 700 revolutions per minute. The flask, which was fitted with a reflux condenser, was immersed in an oil bath at 92° C. After ½ hour, 220 ccs. of styrene containing 0.4 gm. benzoyl peroxide was added to the flask and this was followed ¼ hour later by the addition of 0.42 gm. of a substantially neutral calcium phosphate, which had been prepared by precipitation with phosphoric acid from a hot dilute aqueous suspension of lime and had a $CaO/P_2O_5$ ratio by weight of about 1.38. Stirring was continued at the temperature of 92° C. and 5½ hours after the addition of the styrene, 5 parts per million by weight (of the whole system) of potassium persulphate were added. After stirring for a further 6½ hours at 92° C. hard polystyrene pearls were obtained.

EXAMPLE 5

220 ccs. of water were stirred in a 500 ccs. three necked flask with a V stirrer at 700 revolutions per minute. The flask, which was fitted with a reflux condenser, was immersed in an oil bath at 90° C. After ½ hour, 220 ccs. of styrene, containing 0.4 gm. benzoyl peroxide, were added to the flask and this was followed after ¼ hour by the addition of 0.42 gm. of a substantially neutral calcium phosphate prepared by precipitation with phosphoric acid from a hot dilute aqueous suspension of lime and having a $CaO/P_2O_5$ ratio by weight of about 1.38. 5 parts per million by weight of the system, of sodium persulphate were added together with the phosphate. After stirring at 90° C. for 12 hours, hard polystyrene pearls were obtained.

EXAMPLE 6

Example 5 was repeated using ammonium persulphate instead of sodium persulphate and this resulted in the production of hard pearls.

The pearls obtained in Examples 5 and 6 were finer and more uniform than those obtained without the addition of a persulphate, over 90% passing through B. S. S. sieve No. 14 in each case.

EXAMPLE 7

110 ccs. of methyl methacrylate containing 0.11 gm. of benzoyl peroxide were stirred with 330 ccs. demineralised water in a 500 cc. flask, fitted with a reflux condenser, at 80° C. After 10 minutes 0.44 gm. of a calcium phosphate similar to that used in Example 2, were added together with 5 parts per million by weight of the system, of potassium persulphate. Stirring was continued at a temperature of 80° C. for 7 hours. Hard pearls of polymethylmethacrylate were obtained. These pearls were finer and more uniform than those obtained without the addition of a persulphate.

EXAMPLE 8

160 gms. of a mixture of 90% by weight of styrene and 10% by weight of acrylonitrile plus 0.32 gm. of benzoyl peroxide were stirred with 240 ccs. of demineralised water in a 500 cc. flask, fitted with a reflux condenser, at a temperature of 85° C. After 15 minutes, 0.8 gm. of a calcium phosphate similar to that used in Example 5 were added together with 5 parts per million by weight of the system, of potassium persulphate. Stirring was continued for 15 hours, the temperature being maintained at 85° C. for the first 2 hours, 90° C. for the following 4 hours and 95° C. for the following 9 hours. Hard pearls of the copolymers which had an improved sieve analysis were obtained.

The polymerisation processes described in the above examples were carried out under a blanket of nitrogen. The calcium phosphate added in each case was a finely divided phosphate which had been passed through a 200 mesh sieve.

The pearls obtained in each of the examples were washed with dilute acid to dissolve any adhering calcium phosphate and then with water to obtain an acid-free product which was dried.

We claim:

1. In the polymerisation in aqueous suspension of unsaturated organic compounds containing a $CH_2:C<$ group in the molecule, in the presence of a monomer soluble polymerisation catalyst and of a calcium phosphate as suspension stabiliser, the step which comprises adding to the aqueous suspension up to 0.01% by weight of the system of a water-soluble persulphate, the total quantity of the water soluble persulphate in the suspension not exceeding .01%.

2. The process of claim 1, in which the persulphate is potassium persulphate.

3. The process of claim 1, in which the calcium phosphate has a $CaO/P_2O_5$ ratio by weight of at least 1.35 and is substantially neutral.

4. The process of claim 1, in which the persulphate is added before the polymerisation is 75% complete.

5. The process of claim 1 in which the monomer soluble polymerisation catalyst is benzoyl peroxide.

6. The process of claim 4, in which the persulphate is added in a number of stages.

7. A process for the suspension polymerisation of styrene which comprises polymerising styrene in aqueous suspension in the presence of a monomer soluble polymerisation catalyst and of suspended finely divided particles of a calcium phosphate suspension stabiliser and in the presence, during at least part of the polymerisation process, of an aqueous solution of a persulphate, the total quantity of dissolved persulphate in the suspension not exceeding .01% by weight of the system.

8. The process of claim 7, in which the persulphate is potassium persulphate.

9. The process of claim 7, in which the persulphate is added to the aqueous suspension before the polymerisation is 75% complete.

10. The process of claim 9, in which the persulphate is added in a number of stages.

11. The process of claim 7, in which the calcium phosphate is commercial tricalcium phosphate.

12. A process for the suspension polymerisation of styrene which comprises polymerising styrene in aqueous suspension in the presence of a monomer soluble polymerisation catalyst, of from 0.05 to 0.5% by weight of the system of suspended, finely divided particles of a substantially neutral calcium phosphate having a $CaO/P_2O_5$ ratio by weight of at least 1.35 and in the presence of, during at least part of the polymerisation process, an aqueous solution of persulphate, the total quantity of dissolved persulphate in the suspension not exceeding .01% by weight of the system.

13. The process of claim 12, in which the amount of persulphate present does not exceed 0.001% by weight of the system.

14. The process of claim 12, in which the persulphate is potassium persulphate.

15. The process of claim 12, in which the persulphate is added to the aqueous suspension before the polymerisation is 75% complete.

16. The process of claim 15, in which the persulphate is added in a number of stages.

17. The process of claim 12 in which the styrene to water ratio by volume in the aqueous suspension is from 2:3 to 3:2.

18. In the suspension polymerisation of styrene by heating in aqueous suspension in the presence of a monomer soluble polymerisation catalyst, the steps of dispersing the styrene containing the catalyst in an aqueous medium by agitation, heating the aqueous suspension thus formed at or close to the temperature of polymerisation, with continuing agitation for from about 10 to 45 minutes, then adding to the aqueous suspension from 0.05 to 0.5% by weight of the system of finely divided particles of a substantially neutral calcium phosphate having a $CaO/P_2O_5$ ratio of at least 1.35 together with up to 0.01% by weight of a water-soluble persulphate and continuing the agitation and heating until the polymerisation is completed, the total quantity of dissolved persulphate in the suspension not exceeding .01%.

19. The process of claim 18, in which part of the persulphate is added together with the calcium phosphate and the remainder is subsequently added.

20. The process of claim 19, in which the addition of the persulphate is completed before the polymerisation is 75% complete.

21. The process of claim 18, in which the amount of calcium phosphate added is from 0.05 to 0.20% by weight of the system.

22. The process of claim 18, in which the persulphate is potassium persulphate and in which the amount of persulphate added does not exceed 0.001% by weight of the system.

23. A process for the suspension polymerisation of styrene together with a minor proportion of another unsaturated organic compound containing a $CH_2:C<$ group in the molecule which comprises polymerising styrene and said another unsaturated organic compound in aqueous suspension in the presence of a monomer soluble polymerisation catalyst, of suspended, finely divided particles of a calcium phosphate suspension stabiliser and in the presence, during at least part of the polymerisation process, of an aqueous solution of a persulphate, the total quantity of dissolved persulphate in the suspension not exceeding .01% by weight of the system.

24. The process of claim 23, in which the calcium phosphate is a substantially neutral calcium phosphate having a $CaO/P_2O_5$ ratio of at least 1.35 and constitutes from 0.05 to 0.5% by weight of the system.

25. The process of claim 23, in which the persulphate is potassium persulphate.

26. The process of claim 23, in which the persulphate is added to the aqueous suspension before the polymerisation is 75% complete.

27. The process of claim 26 in which the persulphate is added in a number of stages.

28. A process for the suspension polymerisation of methyl methacrylate which comprises polymerising methyl methacrylate in aqueous suspension in the presence of a monomer soluble polymerisation catalyst, of from 0.05 to 0.5% by weight of the system of suspended, finely divided particles of a substantially neutral calcium phosphate having a $CaO/P_2O_5$ ratio by weight of at least 1.35 and in the presence of, during at least part of the polymerisation process, an aqueous solution of a persulphate, the total quantity of dissolved persulphate in the suspension not exceeding .01% by weight of the sytem.

WALTER PETER HOHENSTEIN.
ROBERT NOBBS HAWARD.
JOYCE ELLY.

References Cited in the file of this patent

UNITED STATES PATENTS

| Number | Name | Date |
|---|---|---|
| 1,896,491 | Luther | Feb. 7, 1933 |
| 2,296,403 | Renfrew | Sept. 22, 1942 |
| 2,524,627 | Hohenstein | Oct. 3, 1950 |
| 2,594,913 | Grim | Apr. 29, 1952 |